(12) United States Patent
Bickham

(10) Patent No.: US 6,975,801 B2
(45) Date of Patent: Dec. 13, 2005

(54) DISPERSION COMPENSATING FIBER FOR LOW SLOPE TRANSMISSION FIBER AND OPTICAL TRANSMISSION LINE UTILIZING SAME

(75) Inventor: Scott R. Bickham, Corning, NY (US)

(73) Assignee: Corning Incorporated, Corning, NY (US)

( * ) Notice: Subject to any disclaimer, the term of this patent is extended or adjusted under 35 U.S.C. 154(b) by 196 days.

(21) Appl. No.: 10/196,076

(22) Filed: Jul. 15, 2002

(65) Prior Publication Data

US 2004/0008958 A1  Jan. 15, 2004

(51) Int. Cl.[7] ................................................ G02B 6/16
(52) U.S. Cl. ..................................... 385/124; 385/123
(58) Field of Search ................................ 385/123–128

(56) References Cited

U.S. PATENT DOCUMENTS

| | | | |
|---|---|---|---|
| 4,715,679 A | 12/1987 | Bhagavatula | 350/96.33 |
| 5,361,319 A | 11/1994 | Antos et al. | 385/123 |
| 5,448,674 A | 9/1995 | Vengsarkar et al. | 385/123 |
| 5,555,340 A | 9/1996 | Onishi et al. | 385/127 |
| 5,568,583 A | 10/1996 | Akasaka et al. | 385/123 |
| 5,673,354 A | 9/1997 | Akasaka et al. | 385/127 |
| 5,748,824 A * | 5/1998 | Smith | 385/124 |
| 5,838,867 A * | 11/1998 | Onishi et al. | 385/123 |

(Continued)

FOREIGN PATENT DOCUMENTS

| | | | |
|---|---|---|---|
| DE | 1054275 | 11/2000 | G02B 6/16 |
| DE | 1130428 | 9/2001 | G02B 6/16 |
| EP | 1122562 | 8/2001 | G02B 6/16 |
| FR | 1004905 | 4/2002 | G02B 6/16 |

(Continued)

OTHER PUBLICATIONS

U.S. Appl. No. 10/098,889, filed Mar. 14, 2002, Bickham et al.

(Continued)

*Primary Examiner*—Joseph Williams
*Assistant Examiner*—Dalei Dong
(74) *Attorney, Agent, or Firm*—Randall S. Wayland

(57) ABSTRACT

A Dispersion Compensation (DC) fiber for low slope transmission fiber (such as a NZDSF) and transmission line including same. The DC fiber has a refractive index profile having a central core with a core delta ($\Delta 1$) value less than 1.8%, a moat surrounding the central core having a moat delta ($\Delta 2$) value greater than $-0.9\%$, and a ring surrounding the moat having a positive ring delta ($\Delta 3$). The DC fiber's refractive index profile is selected to provide total dispersion less than $-40$ and greater than $-87$ ps/nm/km, and kappa of greater than 165 and less than 270 nm, all at 1550 nm. The DC fiber, when used in a transmission line, may provide low average residual dispersion across the C, L, and C+L when such lines include transmission fibers with a total dispersion between 4 and 10 ps/nm/km and a dispersion slope less than 0.045 ps/nm²/km at 1550 nm.

25 Claims, 15 Drawing Sheets

U.S. PATENT DOCUMENTS

| | | | | |
|---|---|---|---|---|
| 5,999,679 A | 12/1999 | Antos et al. | ................. | 385/127 |
| 6,009,221 A | 12/1999 | Tsuda | ................. | 385/123 |
| 6,169,837 B1 * | 1/2001 | Kato et al. | ................. | 385/127 |
| 6,263,138 B1 * | 7/2001 | Sillard et al. | ................. | 385/123 |
| 6,345,140 B1 * | 2/2002 | Sasaoka et al. | ................. | 385/123 |
| 6,349,163 B1 | 2/2002 | Antos et al. | ................. | 385/127 |
| 6,400,877 B1 * | 6/2002 | Kato et al. | ................. | 385/123 |
| 6,404,967 B2 | 6/2002 | Arai et al. | ................. | 385/126 |
| 6,477,306 B2 * | 11/2002 | Kato et al. | ................. | 385/123 |
| 2001/0055436 A1 | 12/2001 | Sugizaki et al. | ................. | 385/10 |
| 2002/0012510 A1 | 1/2002 | Jiang et al. | ................. | 385/123 |
| 2002/0018631 A1 | 2/2002 | Arai et al. | ................. | 385/127 |
| 2002/0090186 A1 | 7/2002 | Sillard et al. | ................. | 385/123 |

FOREIGN PATENT DOCUMENTS

| | | | | |
|---|---|---|---|---|
| GB | 1043609 | 10/2000 | ............ | G02B 6/16 |
| WO | WO 98/04941 | 2/1998 | ............ | G02B 6/22 |
| WO | WO 00/67053 | 11/2000 | ............ | G02B 6/16 |
| WO | WO 01/25828 | 4/2001 | ............ | G02B 6/00 |
| WO | WO 01/73486 | 10/2001 | ............ | G02B 6/00 |
| WO | WO 01/92931 | 12/2001 | ............ | G02B 6/16 |

OTHER PUBLICATIONS

U.S. Appl. No. 60/357,539, filed Feb. 15, 2002, Bickham et al.

* cited by examiner

Fig. 10

| | No.1 | No.2 | No.3 | No.4 | No.5 | No.6 | No.7 | No.8 | No.9 | No.10 | No.11 |
|---|---|---|---|---|---|---|---|---|---|---|---|
| Δ⁺ (%) | 1.0 | 1.0 | 0.9 | 0.8 | 1.2 | 1.2 | 1.4 | 1.0 | 1.0 | 1.0 | 0.6 |
| Δ⁻ (%) | 0.50 | 0.40 | 0.40 | 0.40 | 0.50 | 0.40 | 0.50 | 0.50 | 0.50 | 0.40 | 0.40 |
| 2a (μm) | 4.66 | 4.55 | 4.80 | 5.20 | 4.10 | 4.00 | 3.70 | 5.50 | 6.50 | 4.40 | 5.80 |
| Ra | 0.35 | 0.33 | 0.33 | 0.33 | 0.35 | 0.33 | 0.35 | 0.50 | 0.35 | 0.33 | 0.35 |
| Disp@1550(ps/km/nm) | -18 | -20 | -12 | -4 | -35 | -39 | -60 | 2 | 5 | -28 | -2 |
| Slope@1550 (ps/km/nm$^2$) | -0.30 | -0.28 | -0.19 | -0.12 | -0.15 | -0.14 | -0.20 | -0.02 | 0.06 | -0.40 | -0.20 |
| Total Slope@1550 (ps/km/nm$^2$) | 0.01 | 0.02 | 0.02 | -0.02 | 0.05 | 0.05 | 0.06 | Compensation impossible | 0.02 | -0.24 |  |
| Loss@1550(dB/km) | 0.27 | 0.25 | 0.24 | 0.22 | 0.29 | 0.29 | 0.33 | 0.27 | 0.26 | 0.33 | 0.22 |
| PMD(ps/√km) | 0.08 | 0.11 | 0.09 | 0.10 | 0.11 | 0.09 | 0.12 | 0.10 | 0.11 | 0.10 | 0.06 |
| MFD(μm) | 5.5 | 5.6 | 5.6 | 5.9 | 5.1 | 5.1 | 5 | 5.9 | 6 | 5.7 | 6.1 |
| Cut-off(μm) | 0.79 | 0.78 | 0.81 | 0.8 | 0.77 | 0.76 | 0.78 | 0.89 | 0.9 | 0.77 | 0.78 |
| Bend Loss(dB/m) | 11 | 15 | 13 | 25 | 9 | 11 | 2 | 0.8 | 0.5 | 18 | 13 |
| Kappa | 60 | 71 | 63 | 33 | 233 | 279 | 300 | -100 | 83 | 70 | 10 |

Fig. 11

| | No.12 | No.13 | No.14 |
|---|---|---|---|
| Δ⁺ (%) | 1.0 | 1.0 | 1.0 |
| Δ⁻ (%) | 0.5 | 0.5 | 0.5 |
| Δr (%) | 0.2 | 0.2 | 0.3 |
| 2a (μm) | 4.5 | 4.6 | 4.9 |
| Ra | 0.35 | 0.35 | 0.35 |
| Disp@1550(ps/km/nm) | -30 | -18 | -5 |
| Slope@1550 (ps/km/nm$^2$) | -0.39 | -0.19 | -0.06 |
| Total Slope@1550 (ps/km/nm$^2$) | +0.03 | +0.03 | +0.03 |
| Loss@1550(dB/km) | 0.28 | 0.28 | 0.29 |
| PMD(ps/√km) | 0.08 | 0.07 | 0.07 |
| MFD(μm) | 5.3 | 5.3 | 5.3 |
| Cut-off(μm) | 0.8 | 0.82 | 0.83 |
| Bend Loss(dB/m) | 10 | 4 | 0.5 |
| Kappa | 77 | 95 | 83 |

DISPERSION COMPENSATING FIBER FOR LOW SLOPE TRANSMISSION FIBER AND OPTICAL TRANSMISSION LINE UTILIZING SAME

BACKGROUND OF THE INVENTION

1. Field of the Invention

The present invention relates generally to optical fiber, and more particularly to dispersion compensation fiber and transmission lines including combinations of NZDSF transmission fiber and dispersion compensation fiber.

2. Technical Background

Higher data rates and wider bandwidth systems are becoming needed for the telecommunications industry. Thus, the search for high performance optical fibers designed for long distance, high bit rate telecommunications that operate over broad bandwidths has intensified. These high data rates and broad bandwidths, however, have penalties associated with them. In particular, dispersion is a significant problem in such systems. More specifically, positive dispersion builds along the length of the high data rate transmission fiber. Dispersion Compensating (DC) fibers included in cable or in Dispersion Compensation Modules (DCM's) have been designed that compensate for such dispersion. These fibers generally have negative dispersion slope and negative total dispersion, with the dispersion having a large negative value such that a short length of the DC fiber compensates for the positive dispersion and positive slope of the longer transmission portion. For C- and L-band operation between 1525 nm and 1625 nm, the bend performance (both macro-bending and micro-bending) and other properties, such as dispersion and kappa linearity (kappa being the ratio of total dispersion divided by dispersion slope at a specific wavelength) of the DC fiber are very important.

Thus, there is a need for a DC fiber which: (1) exhibits fairly linear properties over the C- and L-bands in a wavelength range (1525 nm to 1625 nm); (2) retains the usual high performance optical fiber characteristics such as high strength, low attenuation and acceptable resistance to micro- and macro-bend induced loss, and (3) is particularly effective at compensation for the dispersion of low slope NZDSF transmission fibers across the C and L bands with low average residual dispersion.

SUMMARY OF THE INVENTION

DEFINITIONS

The following definitions are used herein.

Refractive Index Profile—The refractive index profile is the relationship between refractive index and optical fiber radius (as measured from the fiber's centerline) for the DC fiber.

Segmented Core—A segmented core is one that has multiple segments in the physical core, such as a first and a second segment (a central core, a moat and a ring, for example). Each core segment has a respective refractive index profile and a maximum and minimum refractive index therein.

Radii—As shown in FIG. 3, the radii of the segments of the core 21 are defined in terms of the beginning and end points of the segments of the refractive index profile of the fiber 20. FIG. 3 best illustrates the definitions of radii R1, R2, and R3 used herein. The same dimension conventions apply for defining the radii in the other refractive index profiles described herein in FIGS. 4–10. The radius R1 of the central core 22 is the length that extends from the DC fiber's centerline CL to the point at which the refractive index profile crosses the relative refractive index zero 23 as measured relative to the cladding 28. The outer radius R2 of the moat segment 24 extends from the centerline CL to the radius point at which the outer edge of the moat crosses the refractive index zero 23, as measured relative to the cladding 28. The radius R3 is measured to the radius point at the approximate center of the ring 26. In particular, R3 is measured to the center point 27 of the half height dimension Wh. The half height dimension is the width Wh at the position $\Delta 3/2$, as measured relative to the cladding 28.

Effective Area—The effective area is defined as:

$$A_{eff} = 2\pi (\int E^2 \, r \, dr)^2 / (\int E^4 \, r \, dr),$$

where the integration limits are 0 to $\infty$, r is the fiber radius, and E is the electric field associated with the propagated light as measured at 1550 nm.

$\Delta\%$ or Delta (%)—The term, $\Delta\%$ or Delta (%), represents a relative measure of refractive index defined by the equation:

$$\Delta\% = 100(n_i^2 - n_c^2)/2n_i^2$$

where $n_i$ is the maximum refractive index (highest positive or lowest negative) in the respective region i (e.g., 22, 24, 26), unless otherwise specified, and $n_c$ is the refractive index of the cladding (e.g., 28) unless otherwise specified.

$\alpha$-profile—The term alpha profile, $\alpha$-profile refers to a refractive index profile of the core 22, expressed in terms of $\Delta(b)\%$, where b is radius, which follows the equation, $$\Delta(b)\% = [\Delta(b_o)(1 - [|b - b_o|/(b_1 - b_o)]^\alpha)]100$$

where $b_o$ is the maximum point of the profile of the core and $b_1$ is the point at which $\Delta(b)\%$ is zero and b is in the range $b_i \leq b \leq b_f$, where $\Delta\%$ is defined above, $b_i$ is the initial point of the $\alpha$-profile, $b_f$ is the final point of the $\alpha$-profile, and $\alpha$ is an exponent which is a real number. The initial and final points of the $\alpha$-profile are selected and entered into the computer model. As used herein, if an $\alpha$-profile is preceded by a step index profile, the beginning point of the $\alpha$-profile is the intersection of the $\alpha$-profile and the step profile. In the model, in order to bring about a smooth joining of the $\alpha$-profile with the profile of the adjacent profile segment, the equation is rewritten as;

$$\Delta(b)\% = [\Delta(b_a) + [\Delta(b_o) - \Delta(b_a)]\{(1 - [|b - b_o|/(b_1 - b_o)]^\alpha\}]100,$$

where $b_a$ is the first point of the adjacent segment.

Pin array macro-bending test—This test is used to compare relative resistance of optical fibers to macro-bending. To perform this test, attenuation loss is measured when the optical fiber is arranged such that no induced bending loss occurs. This optical fiber is then woven about the pin array and attenuation again measured. The loss induced by bending is the difference between the two attenuation measurements in dB. The pin array is a set of ten cylindrical pins arranged in a single row and held in a fixed vertical position on a flat surface. The pin spacing is 5 mm, center-to-center. The pin diameter is 0.67 mm. The optical fiber is caused to pass on opposite sides of adjacent pins. During testing, the optical fiber is placed under a tension sufficient to make the optical fiber conform to a portion of the periphery of the pins.

Lateral load test—Another bend test referenced herein is the lateral load test that provides a measure of the micro-bending resistance of the optical fiber. In this test, a prescribed length of optical fiber is placed between two flat plates. A #70 wire mesh is attached to one of the plates. A known length of optical fiber is sandwiched between the plates and the reference attenuation is measured while the plates are pressed together with a force of 30 newtons. A 70 newton force is then applied to the plates and the increase in attenuation in dB/m is measured. This increase in attenuation is the lateral load attenuation of the optical fiber.

SUMMARY

In accordance with embodiments of the present invention, a Dispersion Compensating (DC) fiber is provided having a refractive index profile including a central core having a positive core delta ($\Delta 1$) less than 1.8%, a moat surrounding the central core having a negative moat delta ($\Delta 2$) greater than −0.9%, and a ring surrounding the moat having a positive ring delta ($\Delta 3$). The DC fiber's refractive index profile is selected to provide a total dispersion less than −40 and greater than −87 ps/nm/km at 1550 nm, and a kappa value, defined as the total dispersion at 1550 nm divided by the dispersion slope at 1550 nm, of greater than 165 and less than 270 nm.

In accordance with another embodiment of the invention, an optical transmission line is provided, wherein the dispersion compensation fiber as set forth above is optically coupled to a transmission fiber having a total dispersion between 4 and 10 ps/nm/km at 1550 nm, and a positive dispersion slope of less than 0.045 ps/nm$^2$/km at 1550 nm.

The DC fiber according to the invention has the advantage of having high effective area (greater than 18 square microns at 1550 nm) while at the same time having low bend loss. The high effective area allows for less coupling loss, low nonlinearities, and reduced four wave mixing and cross phase modulation. In addition, the DC fiber exhibits linear dispersion as a function of wavelength. Furthermore, the relatively low core delta of the DC fiber may advantageously lead to lower attenuation because of the lower dopant concentrations in the central core.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

BRIEF DESCRIPTION OF THE DRAWINGS

FIGS. 4–10 are graphic plots of refractive index profiles for other embodiments of DC fiber in accordance with the present invention.

FIG. 11 is a graphic plot of total dispersion as a function of wavelength for the DC fibers of FIGS. 3–10 in accordance with the present invention.

DETAILED DESCRIPTION OF THE PREFERRED EMBODIMENTS

Figure 1:
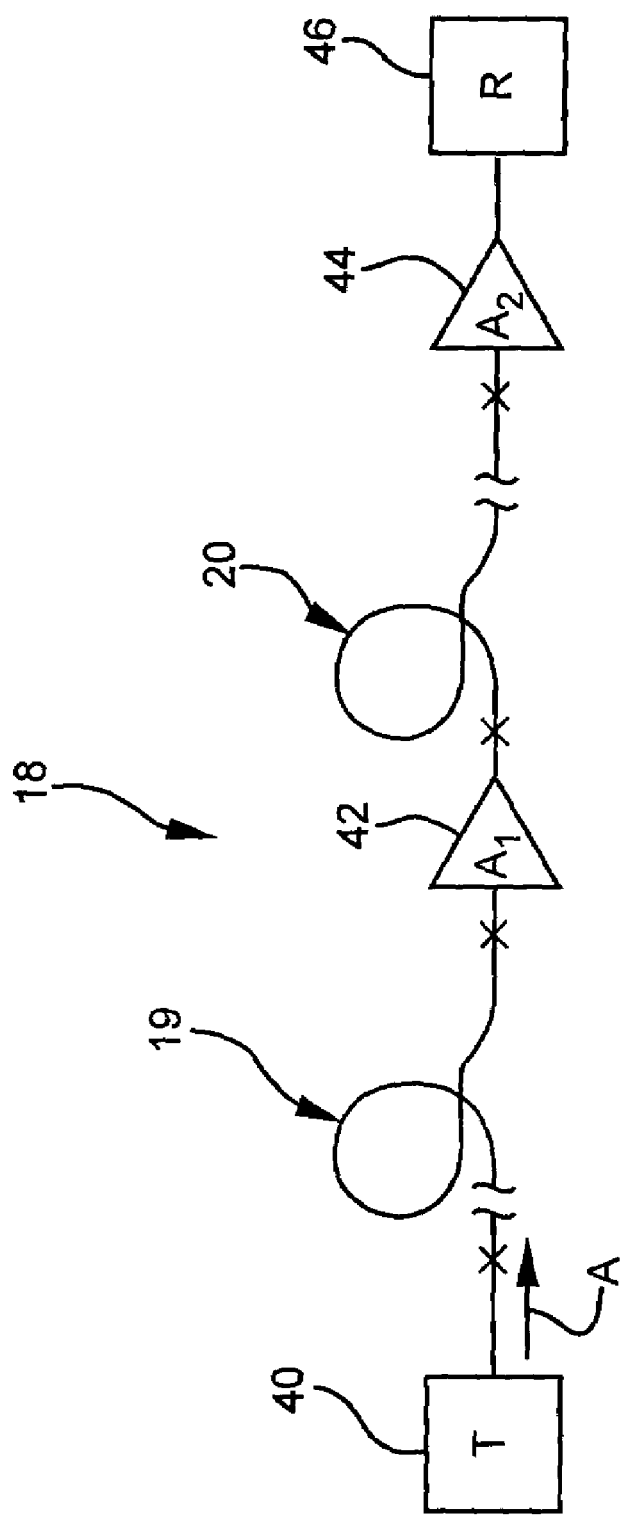
FIG. 1 is a block depiction of a transmission line including a DC fiber in accordance with the present invention.

Reference will now be made in detail to the present preferred embodiment(s) of the invention, examples of which is/are illustrated in the accompanying drawings. Whenever possible, the same reference numerals will be used throughout the drawings to refer to the same or like parts.

By way of example, and not to be considered limiting, an optical transmission line 18 is illustrated in FIG. 1 having a length (preferably about 100 km) of a transmission fiber 19, such as a low slope Non-Zero Dispersion Shifted Fiber (NZDSF), optically coupled to a DC fiber 20 in accordance with embodiments of the invention. One preferred transmission fiber 19 in the transmission line 18 is low slope NZDSF 19, as is shown and described with reference to FIGS. 15 and 16 herein. The transmission fiber 19 has a positive dispersion between about 4 and 10 ps/nm/km at 1550 nm; and more preferably between 4 and 8 ps/nm/km at 1550 nm, and a positive dispersion slope of less than about 0.045 ps/nm$^2$/km at 1550 nm. Kappa of the NZDSF transmission fiber 19 is preferably between about 147 and 240 nm at 1550 nm. Kappa is defined herein as the total dispersion of the fiber at 1550 nm divided by the dispersion slope of the fiber at 1550 nm. In the transmission line 19, the DC fiber 20 compensates for build up of dispersion resulting from passing a light signal through the transmission fiber 19 (as indicated by arrow A). It should be recognized that although the system is described herein as being unidirectional, that transmission lines including the DC fiber 20 described herein may have signals passing in both directions.

In representative transmission lines 18, the built up dispersion of the transmission fiber 19 (e.g., NZDSF) is compensated for by a shorter length of DC fiber 20, having a length of between about 6 to 14 km in accordance with the invention. The transmission line 18 may include a pre-amp 42 and power amp 44 or any other conventional amplifier arrangement. The line 18 may also include other conventional components such as a transmitter 40 and receiver 46. Optionally, the transmission line 18 may couple to one or more additional lengths of NZDSF or other transmission fiber instead of terminating at the receiver 46. Further additional components such as filters, couplers, and amplifiers may also be included in the transmission lines.

Figure 2:
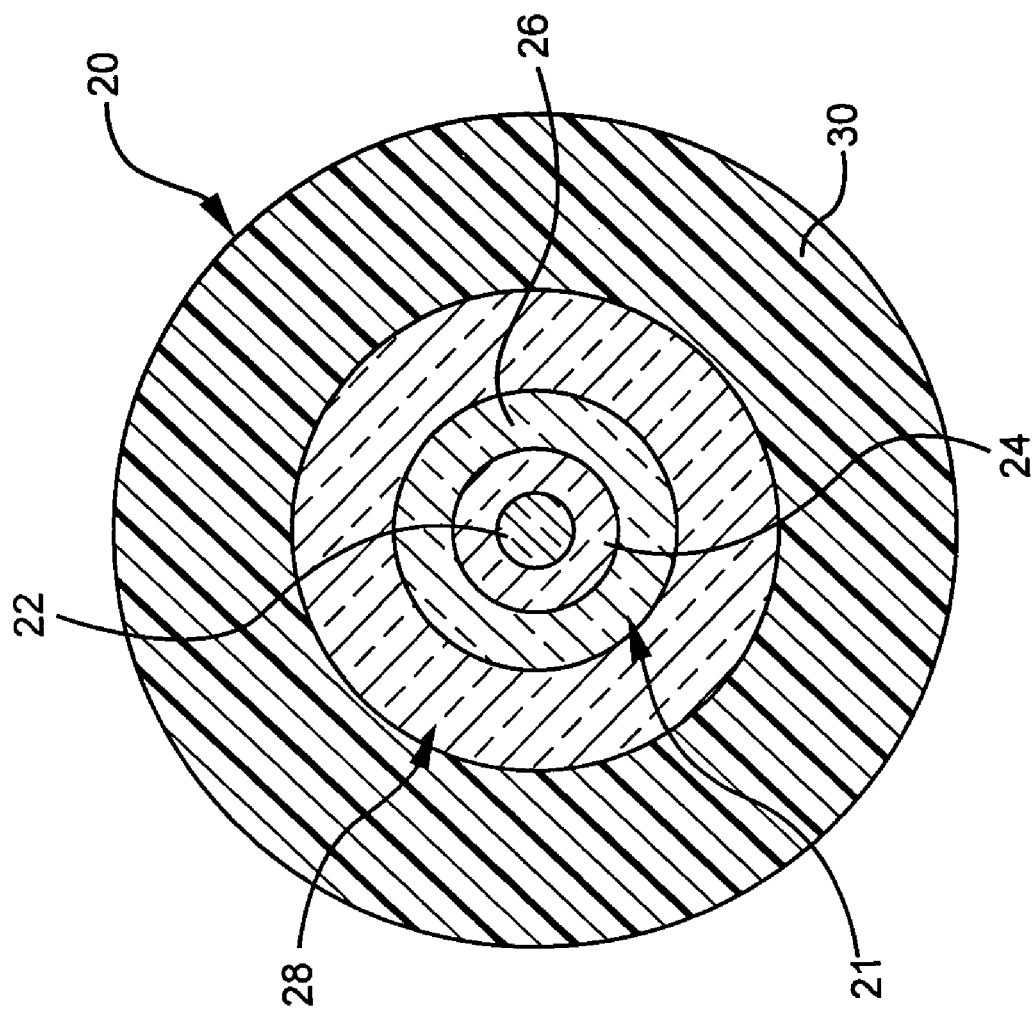
FIG. 2 is a representative cross-sectional end view of embodiments of the DC fiber in accordance with the present invention.
Figure 3:
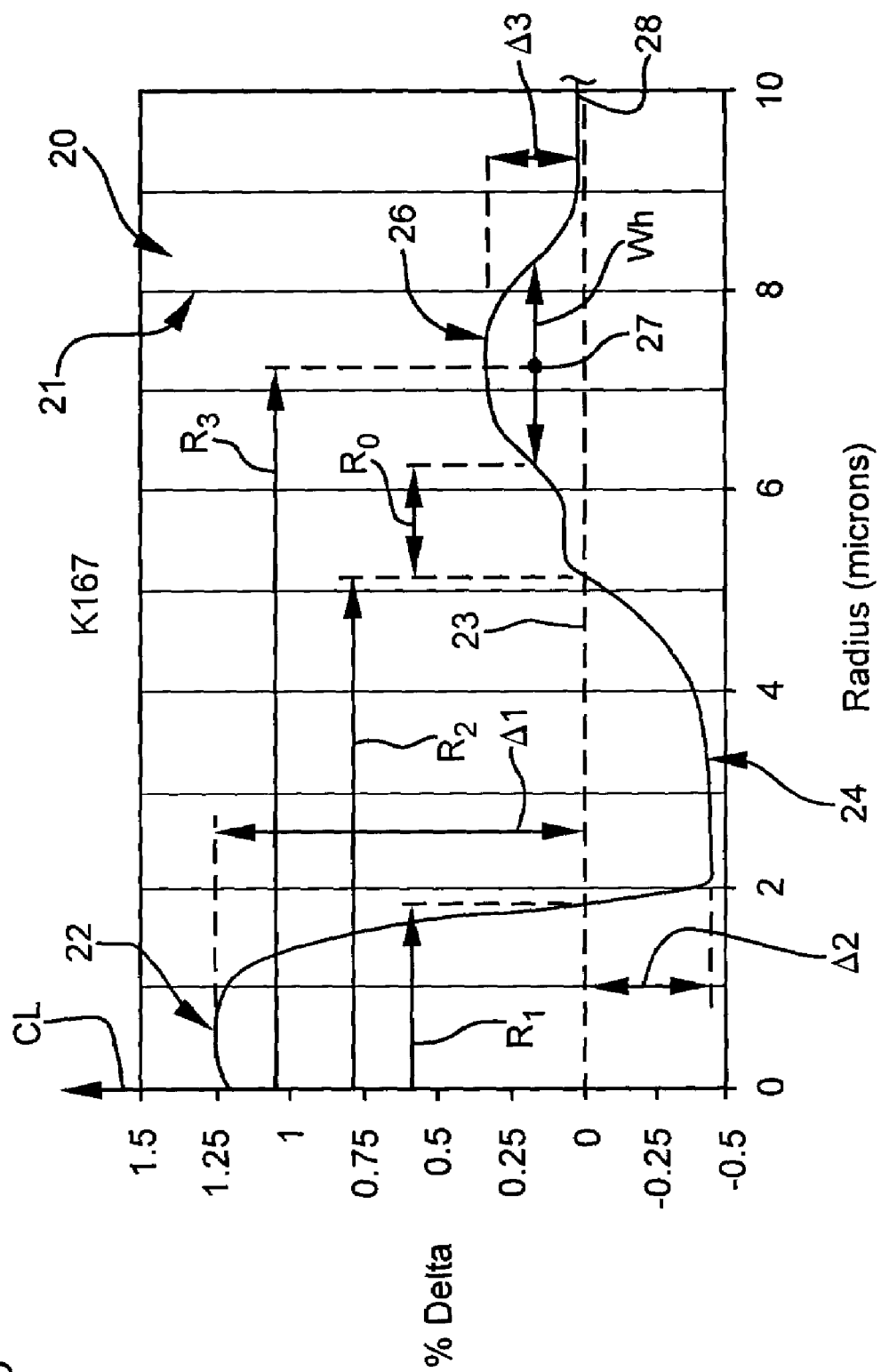
FIG. 3 is a graphic plot of a refractive index profile for one embodiment of DC fiber in accordance with the present invention illustrating various dimensions characterizing the fiber's refractive index profile.
Figure 4:
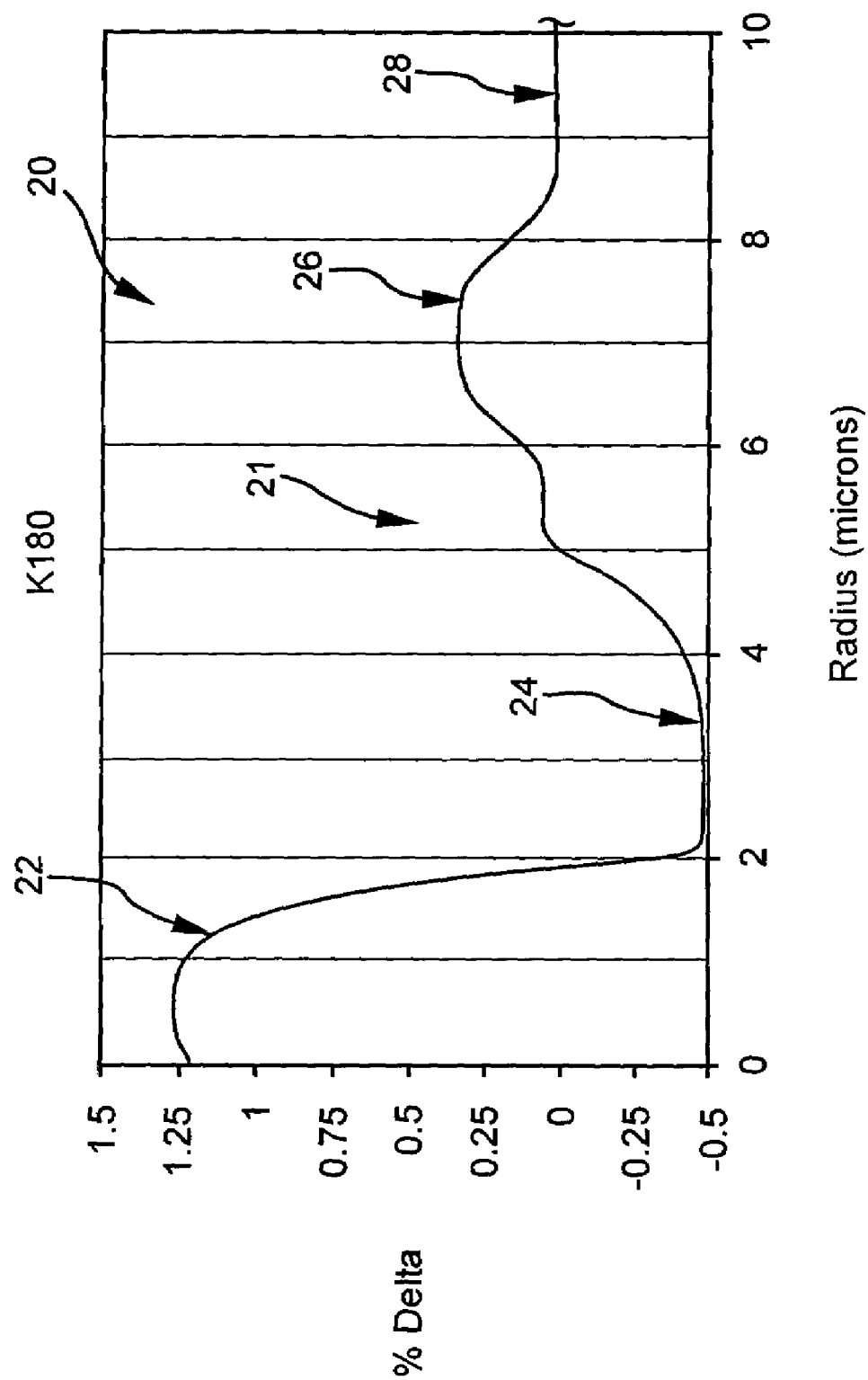
Figure 5:
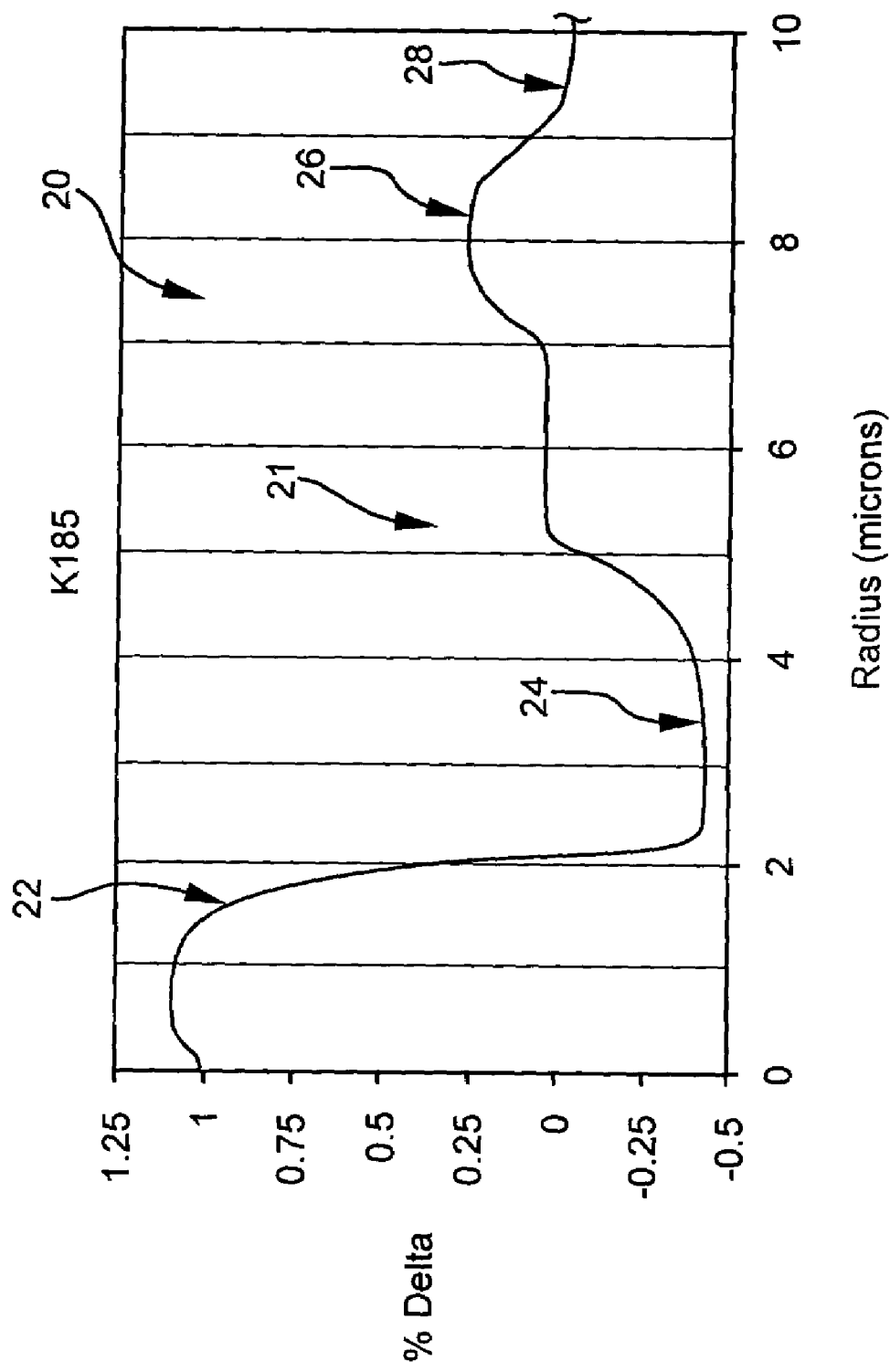

The DC fibers 20 according to the invention have segmented core structures as best illustrated in FIGS. 1–3 including, preferably, a central core 22 having a positive delta, a moat 24 having a negative delta, and a ring 26 having a positive delta (all deltas being measured relative to the cladding 28).

Figure 12:
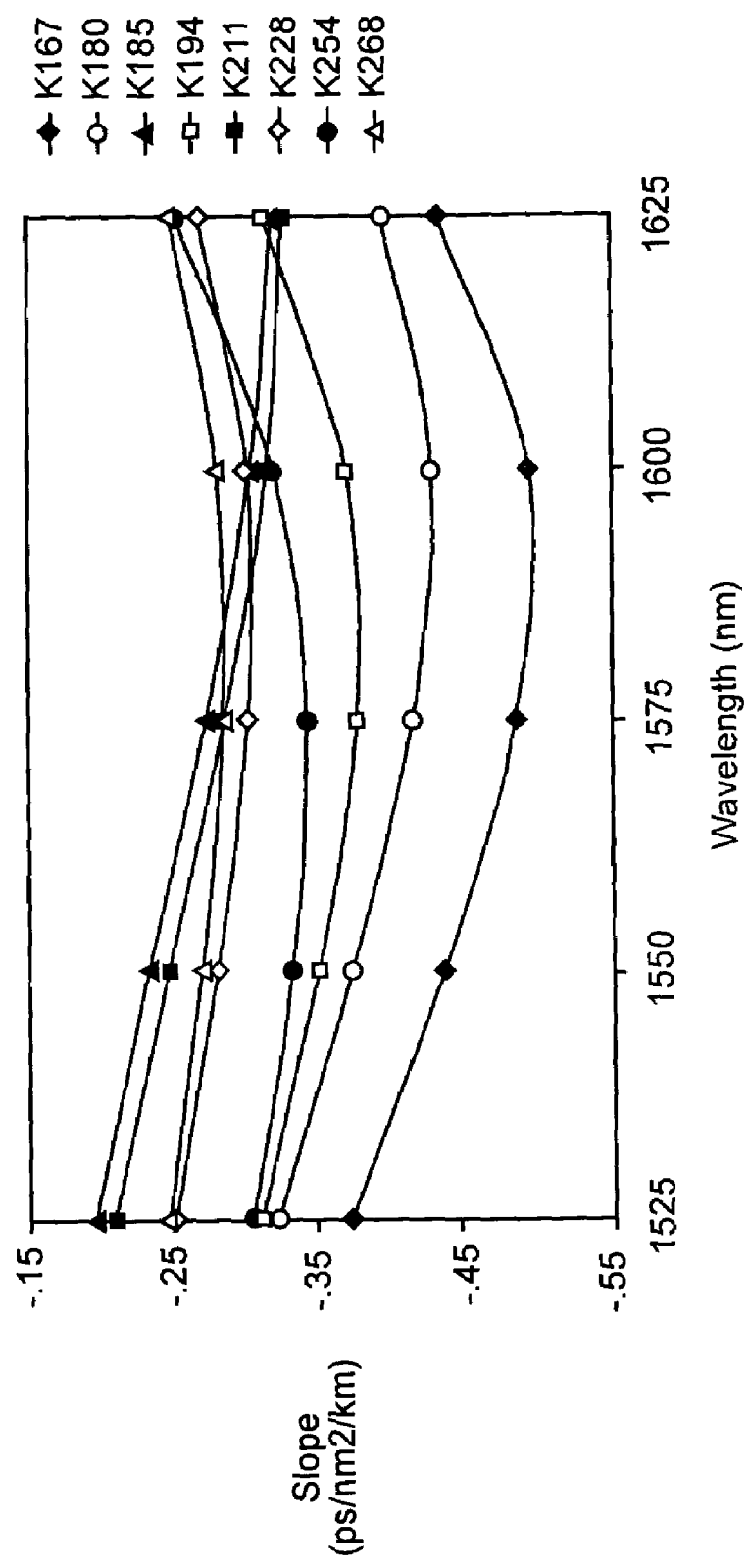
FIG. 12 is a graphic plot of dispersion slope as a function of wavelength for the DC fibers of FIGS. 3–10 in accordance with the present invention.
Figure 13:
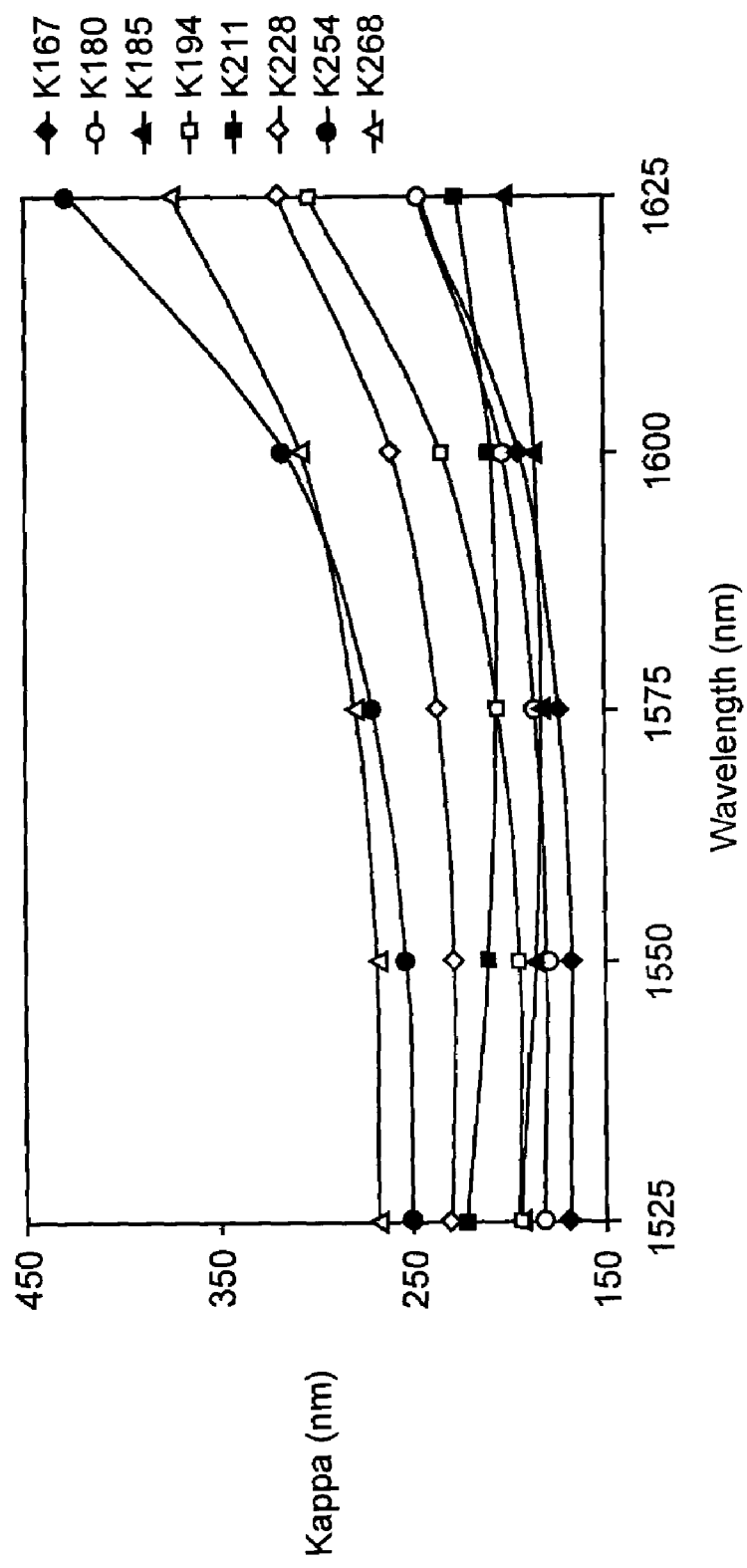
FIG. 13 is a graphic plot of kappa as a function of wavelength for the DC fibers of FIGS. 3–10 in accordance with the present invention.

The family of DC fibers 20 shown in FIGS. 3–10 include a refractive index profile with a physical core 21 having a central core 22 with a positive maximum core delta (Δ1) of less than 1.8%, a moat 24 surrounding the central core 22 having a negative minimum moat delta (Δ2) greater than −0.9%, and a ring 26 surrounding the moat having a positive ring delta (Δ3). The refractive index profile of the DC fibers 20 is selected to provide a total dispersion less than −40 and greater than −87 ps/nm/km at 1550 nm; and a kappa, defined as the total dispersion at 1550 nm divided by the dispersion slope at 1550 nm, of greater than 165 and less than 270 nm. Dispersion slope for the DC fiber 20 is preferably between about −0.20 and −0.45 ps/nm$^2$/km at 1550 nm; more preferably less than −0.3 and greater than −0.45 ps/nm$^2$/km at 1550 nm. Total dispersion, dispersion slope and kappa plots are illustrated in FIGS. 11–13 for all the example DC fibers 20 in accordance with the invention.

In particular, all the DC fibers 20 in accordance with embodiments of the invention have a structure including (as shown in FIGS. 2 and 3) a core 21 having a central core 22 with a core delta (Δ1) measured to the highest point on the central core having a value less than 1.8%, a moat 24 surrounding the central core 22 having a moat delta (Δ2) with a minimum delta value less negative than −0.9% (measured to the lowest point in the moat), and a ring 26 surrounding the moat 24 having a positive ring delta (Δ3) measured to the highest point on the ring. The core 22 preferably includes an α-profile where α is between about 2 and 5. The DC fibers 20 preferably also include a cladding 28 surrounding the core 21 which is preferably silica, but may include other suitable dopants (such as fluorine) as well. The cladding 28 of the DC fibers 20 is preferably surrounded by a conventional polymer coating 30 (see FIG. 2), such as a urethane acrylate coating. Preferably, the coating 30 exhibits a low-modulus primary coating, and a high-modulus outer secondary coating, as is known to those of skill in the art.

The DC fibers 20 in accordance with embodiments of the invention preferably have a core-moat ratio (C-M Ratio), defined as the radius (R1) to the outer edge of the central core 22 (defined relative to the cladding reference 23) divided by a radius (R2) to the outer edge of the moat 24 (defined relative to the cladding reference 23), of greater than 0.3 and less than 0.45; and more preferably greater than 0.37 and less than 0.42.

Figure 14:
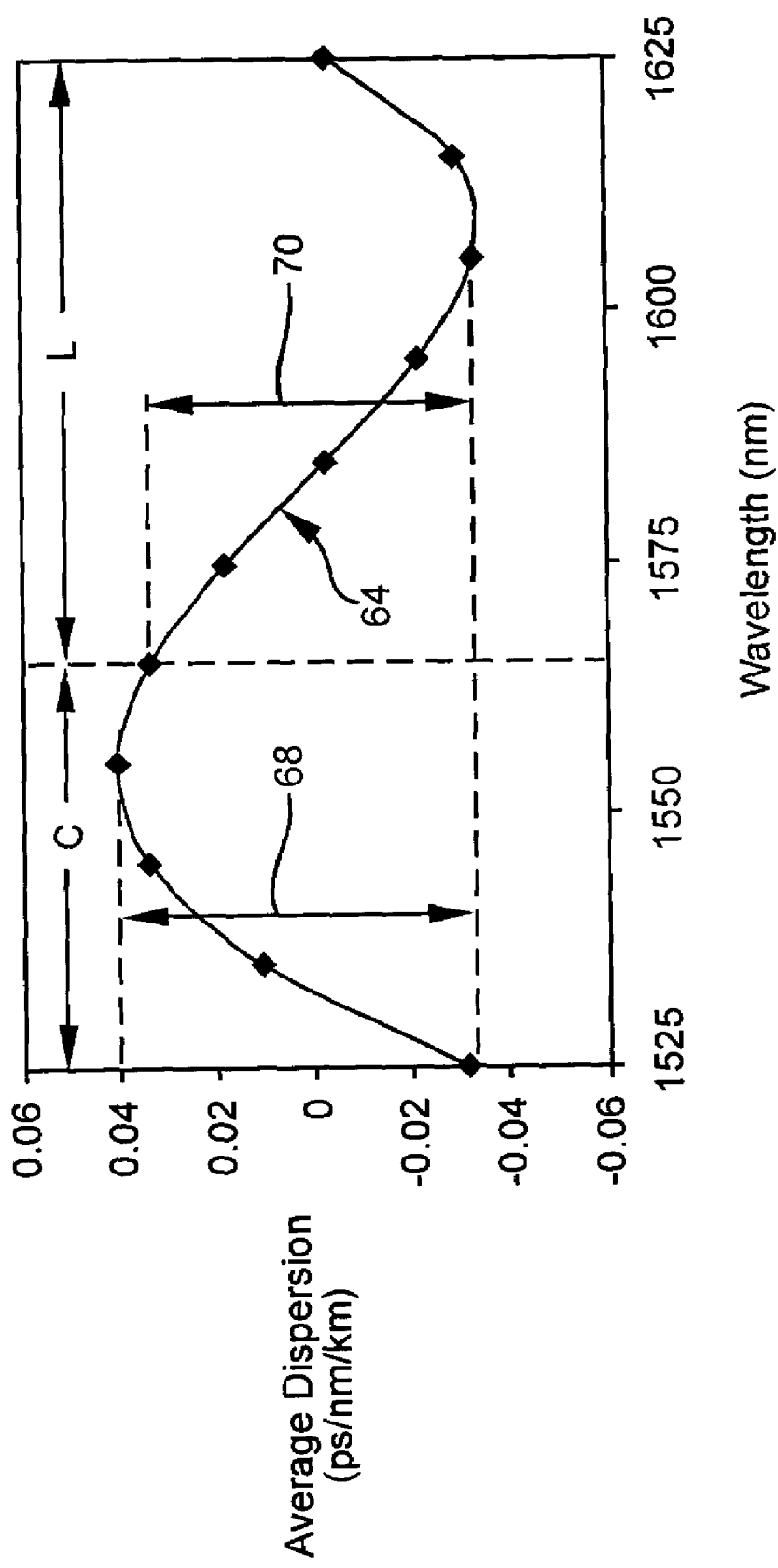
FIG. 14 is a graphic plot of average residual dispersion as a function of wavelength for a transmission line including a DC fiber in accordance with the present invention.

By way of further clarification, the transmission line 18 (FIG. 1) include a first section of positive dispersion, positive dispersion slope transmission fiber 19, such as the NZDSF described above, and a DC fiber 20 in accordance with the invention having a negative total dispersion and a negative dispersion slope. The transmission line 18 described herein illustrates very low average residual dispersions across the C-, L- and C+L bands. FIG. 14 illustrates average residual dispersion of a transmission line 18 including a representative embodiment of the present invention DC fiber 20 described in detail herein below. The DC fibers 20 in accordance with embodiments of the invention may be housed in the form of a conventional Dispersion Compensating Module (DCM), for example.

In accordance with the invention, and in more detail, a family of refractive index profiles of the dispersion compensation fiber 20 are described herein. FIG. 3 will be utilized to describe the refractive index structure of the family of DC fibers 20. The refractive index profiles for the family of Dispersion Compensation (DC) fibers 20 are provided in FIGS. 3–10. The DC fibers 20 each have a refractive index profile including a core 21 surrounded by a cladding 28 which extends to the outermost glass periphery of the fiber. The core 21 has a central core 22 having a core delta (Δ1) with a value less than 1.8%, a moat 24 surrounding the central core 22 having a moat delta (Δ2) with a value less negative than −0.9%, and a ring 26 surrounding the moat 24 having a positive ring delta (Δ3).

The core-moat ratio of the DC fibers 20, defined as a radius (R1) to the outer edge of the central core 22 divided by a radius (R2) to the outer edge of the moat 24, is preferably greater than 0.3 and less than 0.45. One particular advantage of the present invention DC fiber 20 is that the effective area is greater than 18 square microns at 1550 nm, while the pin array bend loss at 1550 nm remains less than 8 dB.

Within the family of DC fibers 20 in accordance with the invention as shown in FIGS. 4–8, a more preferred total dispersion range at a wavelength of 1550 nm is less than −40 and greater than −70 ps/nm/km. The dispersion slope within the family of DC fibers 20, as shown in FIGS. 3–10 ranges between less than −0.2 and greater than −0.45 ps/nm$^2$/km at 1550 nm; and more preferably less than −0.3 and greater than −0.45 ps/nm$^2$/km at 1550 nm. Kappa for the family of DC fibers 20 at 1550 nm is more preferably greater than 175 and less than 230 nm.

As is illustrated in FIG. 13, the family of DC fibers 20 have kappas that are quite linear over the desired transmission bands, e.g., nearly flat over the C-band (1525–1565 nm), and gradually ramping up in the L-band (1565–1625 nm), thereby making them excellent candidates for providing low residual dispersion in transmission lines 18. In particular, as is illustrated in FIG. 13, the DC fibers 20 have kappas that range between 150 and 450 nm over a wavelength range from 1525 to 1625 nm with some ranging between 150 and 250 nm over the C-and L-bands from 1525 to 1625 nm.

The structure of the family of DC fibers 20 in accordance with the invention are shown in FIGS. 3–10 and are listed in Table 1 below as examples 1–8. FIG. 3 illustrates the radii dimensions R1, R2, R3, the delta parameters Δ1, Δ2, and Δ3, the ring half width Wh (the width measured at half the ring delta Δ3/2), and the ring offset Ro. In particular, the conventions utilized to measure these parameters for FIG. 3 are shown only with reference to FIG. 3, but also apply to the refractive index profiles of FIGS. 4–10.

For the family of DC fibers 20 of FIGS. 3–10 according to the invention, the core delta (Δ1) of the central core 22 is more preferably less than 1.8%; and more preferably less than 1.5%. The core radius (R1) of the central core 22 is preferably between about 1.7 and 2.2 microns; and more preferably between about 1.9 and 2.15 microns. Each of the DC fibers 20 includes a moat 24 having a negative moat delta (Δ2). The moat delta (Δ2) for the family of DC fibers 20 is preferably greater than −0.9%; more preferably greater than −0.6%; and most preferably between about −0.35% and −0.5%. In accordance with embodiments of the invention, the outer moat radius (R2) of the moat 24 is preferably between 4.4 and 5.5 microns from the DC fiber's centerline (CL). More preferably, the moat radius (R2) is between about 4.9 and 5.4 microns from the fiber's CL.

In accordance with further features of the invention, the refractive index profile of the family of DC fibers 20 includes a ring 26 having a positive ring delta (Δ3). The ring delta (Δ3) is preferably between about 0.25% and 0.5%, and the ring radius (R3), as measured to the approximate center of the ring 26, is between about 6.5 and 8.5 microns; and more preferably between 7.0 and 8.4 microns. The ring 26 has a ring half width (Wh) which is preferably between about 1.6 to 2.2 microns; and more preferably between 1.7 and 2.0 microns. For this family of DC fibers 20, the ring 26 is offset from the outer edge of the moat 24 by a defined ring offset Ro. The ring offset Ro is determined as follows:

$$Ro=[R3-R2]-Wh/2$$

Ro for the family of DC fibers 20 is preferably greater than 0.5 microns; more preferably greater than 1.0 micron; and most preferably between 0.75 and 2.5 microns.

EXAMPLES

The present invention will be further clarified by the following examples that are summarized in Table 1 below. Table 1 includes attributes (such as Total Dispersion at 1550 nm, Dispersion Slope at 1550 nm, Kappa at 1550 nm, Pin Array at 1550 nm, Lateral Load at 1550 nm, Effective Area at 1550 nm, and cutoff wavelength) and refractive index structural parameters (Δ1, Δ2, Δ3, R1, R2, R3, Ro, Wh, and Core-Moat (C-M) ratio) for the DC fibers 20 in accordance with the invention corresponding to FIGS. 3–10. Legends are included on each plot for identification of the examples.

fiber 19 includes a central core 4, an annular moat region 6, a ring 8, and a gutter 10. The core 4 and the ring 6 are preferably germanium doped and have positive deltas relative to the cladding 12 whereas the moat 6 and the gutter 10 are fluorine doped and preferably have negative deltas in comparison to the cladding 12. Further description of this transmission fiber may be found in U.S. Provisional Application No. 60/357,539 filed Feb. 15, 2002 entitled "Low Slope Dispersion Shifted Optical Fiber," the disclosure of which is hereby incorporated by reference herein. As illustrated in FIG. 14, the modeled High-to-Low average residual dispersion 68 for the transmission line 18 in the C-band is less than 0.10 ps/nm/km; in the L-band, the High-to-Low average residual dispersion 70 is less than 0.10 ps/nm/km; and in the C+L band less than 0.12 ps/nm/km.

In accordance with embodiments of the invention, transmission lines 18 including serially coupled lengths of transmission fiber 19 and DC fiber 20 include transmission fiber 19 having total dispersion ranging from 4 to 10 ps/nm/km at 1550 nm; and more preferably between 4 to 8 ps/nm/km at 1550 nm. The dispersion slope of the transmission fiber 19 is preferably less than 0.045 ps/nm$^2$/km at 1550 nm; and more preferably between 0.025 and 0.045 ps/nm$^2$/km at 1550 nm. Kappa for the transmission fiber 19 is preferably between 147 and 240 nm at 1550 nm.

The DC fibers 20 in accordance with them present invention may be drawn from optical fiber preforms utilizing conventional draw methods and apparatus. The optical fiber preform from which the present invention DC fibers 20 are

TABLE 1

Dispersion Compensation Fiber Examples

| Ex. | Legend | Dispersion (ps/nm/km) | Slope (ps/nm²/km) | Kappa (nm) | Δ1 % | Δ2 % | Δ3 % | R1 (μm) | R2 (μm) | R3 (μm) | Ro (μm) | Wh (μm) | C-M Ratio | Pin Array @ 1550 nm (dB) | Lat. Load @ 1550 nm dB/m | Aeff (μm²) | λc (nm) |
|---|---|---|---|---|---|---|---|---|---|---|---|---|---|---|---|---|---|
| 1 | K167 | −73 | −0.44 | 167 | 1.25 | −0.45 | 0.31 | 1.89 | 5.18 | 7.27 | 1.08 | 2.02 | 0.36 | 6.62 | 0.79 | 20.2 | 1699 |
| 2 | K180 | −67 | −0.38 | 180 | 1.26 | −0.48 | 0.33 | 1.92 | 4.99 | 7.04 | 1.12 | 1.87 | 0.39 | 4.33 | 0.44 | 19.7 | 1638 |
| 3 | K185 | −44 | −0.23 | 185 | 1.09 | −0.43 | 0.29 | 2.01 | 5.07 | 8.02 | 2.08 | 1.73 | 0.41 | 4.43 | 0.48 | 21.6 | 1671 |
| 4 | K194 | −68 | −0.35 | 194 | 1.31 | −0.45 | 0.32 | 2.04 | 4.95 | 7.38 | 1.55 | 1.76 | 0.41 | 6.49 | 0.72 | 21.1 | 1672 |
| 5 | K211 | −52 | −0.25 | 211 | 1.44 | −0.44 | 0.32 | 2.11 | 5.34 | 7.40 | 1.14 | 1.85 | 0.40 | 1.77 | 0.21 | 19.4 | 1677 |
| 6 | K228 | −64 | −0.28 | 228 | 1.37 | −0.41 | 0.30 | 2.00 | 5.15 | 7.38 | 1.24 | 1.98 | 0.39 | 2.78 | 0.36 | 20.4 | 1707 |
| 7 | K253 | −87 | −0.33 | 253 | 1.51 | −0.40 | 0.31 | 1.75 | 4.78 | 7.28 | 1.65 | 1.71 | 0.37 | 2.82 | 0.30 | 19.1 | 1642 |
| 8 | K267 | −72 | −0.27 | 267 | 1.48 | −0.37 | 0.32 | 1.73 | 4.55 | 7.02 | 1.47 | 2.01 | 0.38 | 0.34 | 0.05 | 18.2 | 1732 |

TABLE 2

Low slope NZDSF transmission fiber data

| Attribute | Value |
|---|---|
| Dispersion (ps/nm/km) @ 1550 nm | 6.1 |
| Slope (ps/nm²/km) @ 1550 nm | 0.032 |
| Lambda Zero (nm) | 1395 |
| Kappa (nm) @ 1550 nm | 191 |

Figure 6:
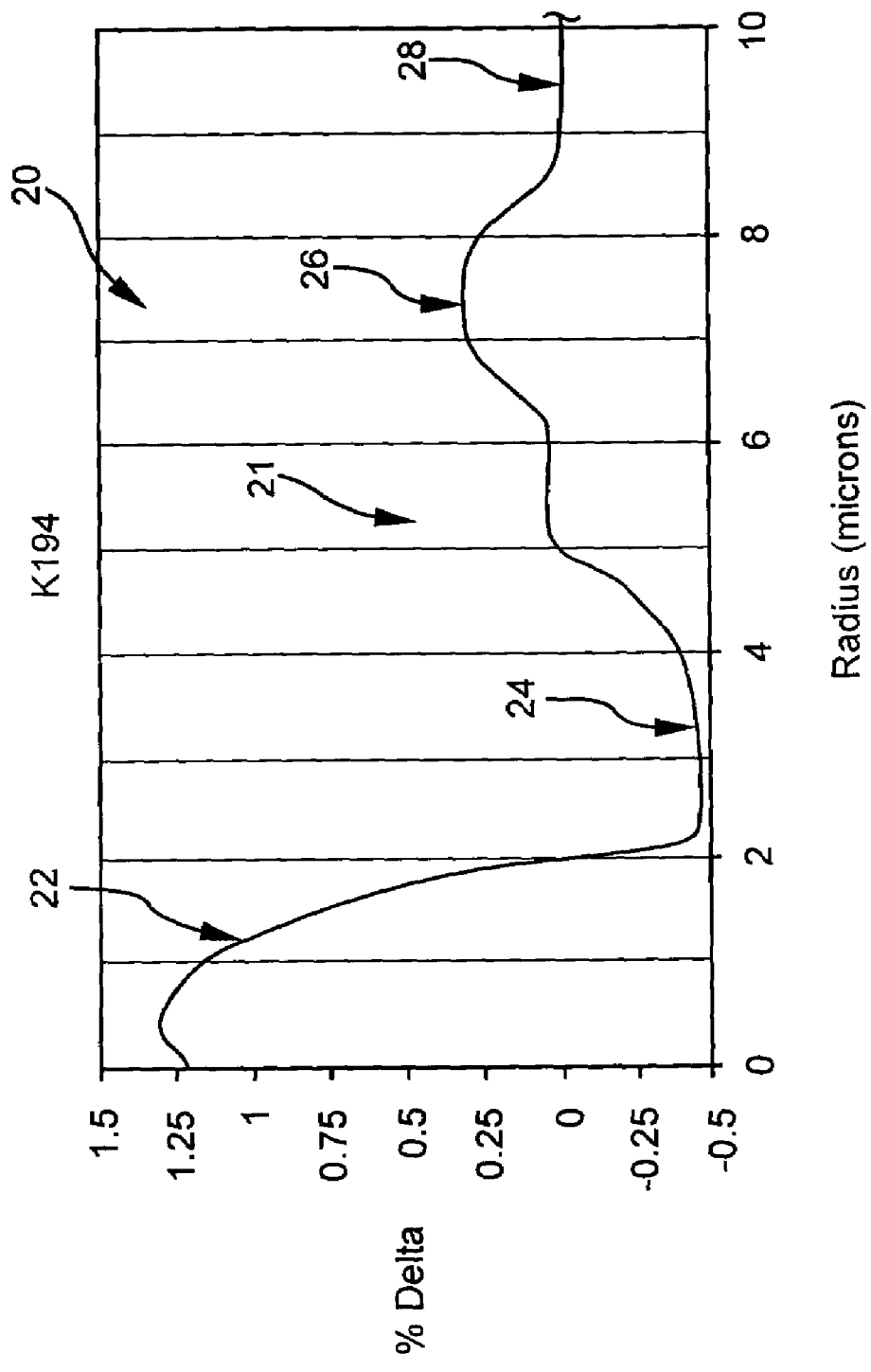
Figure 7:
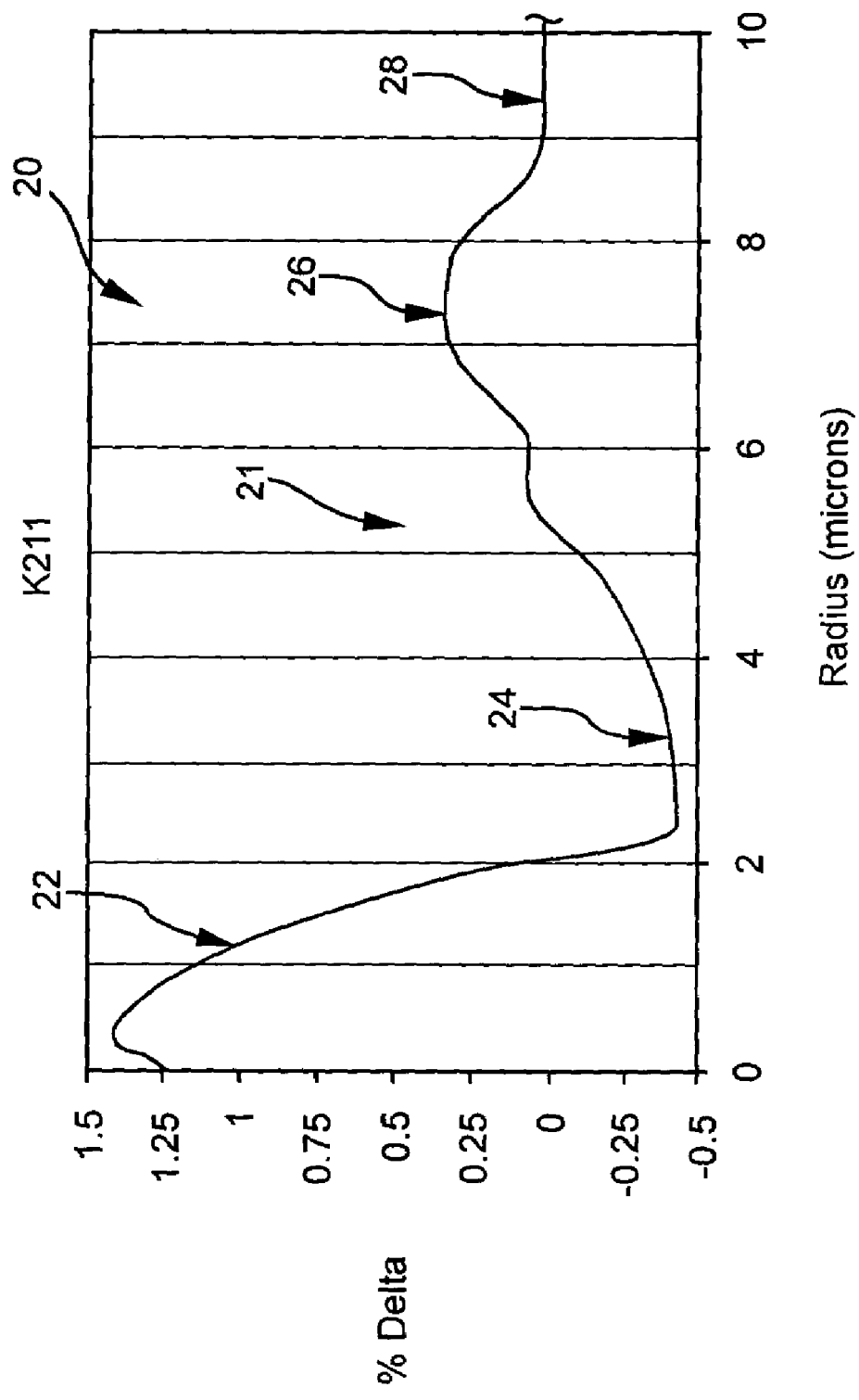
Figure 8:
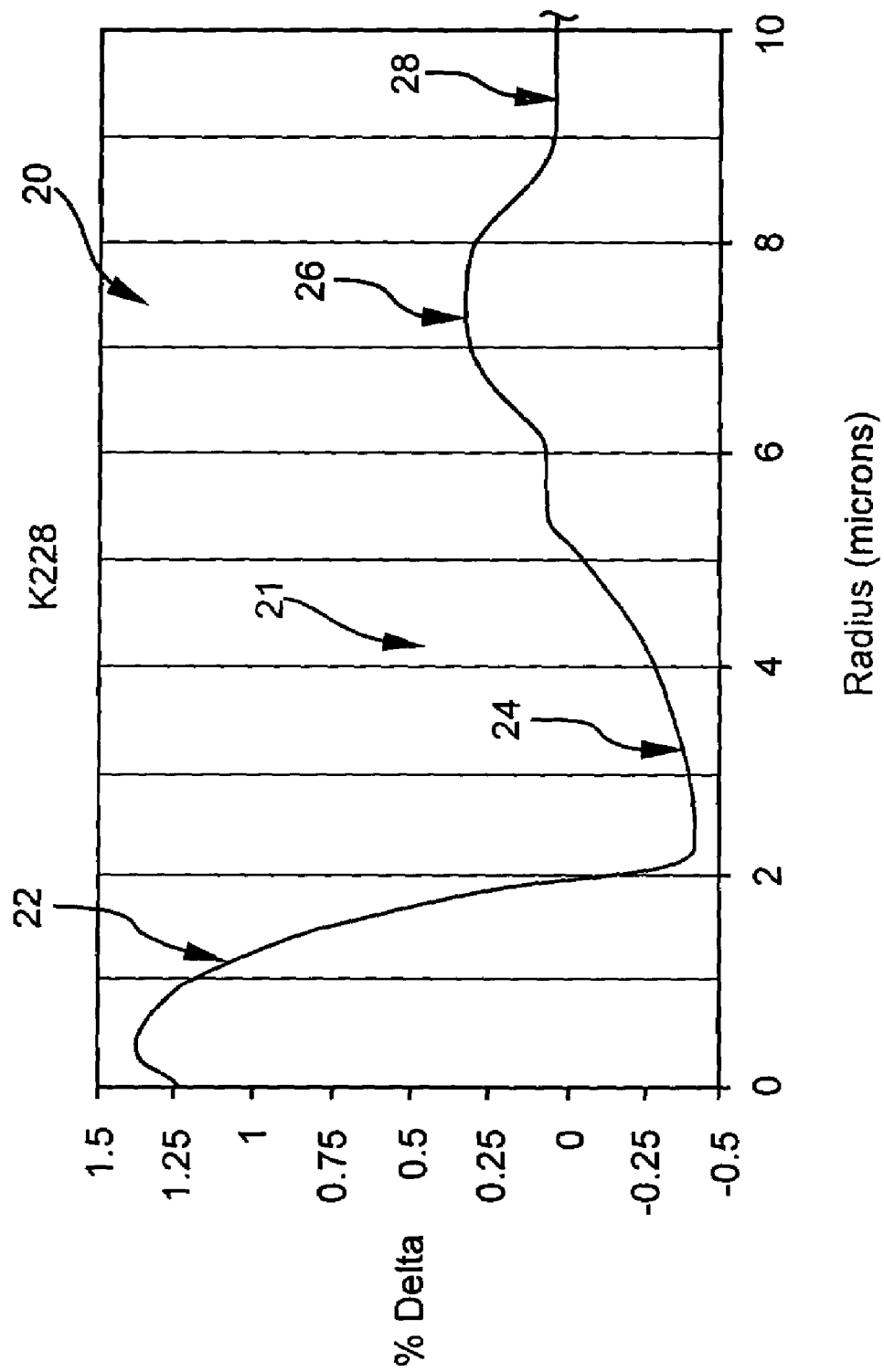
Figure 9:
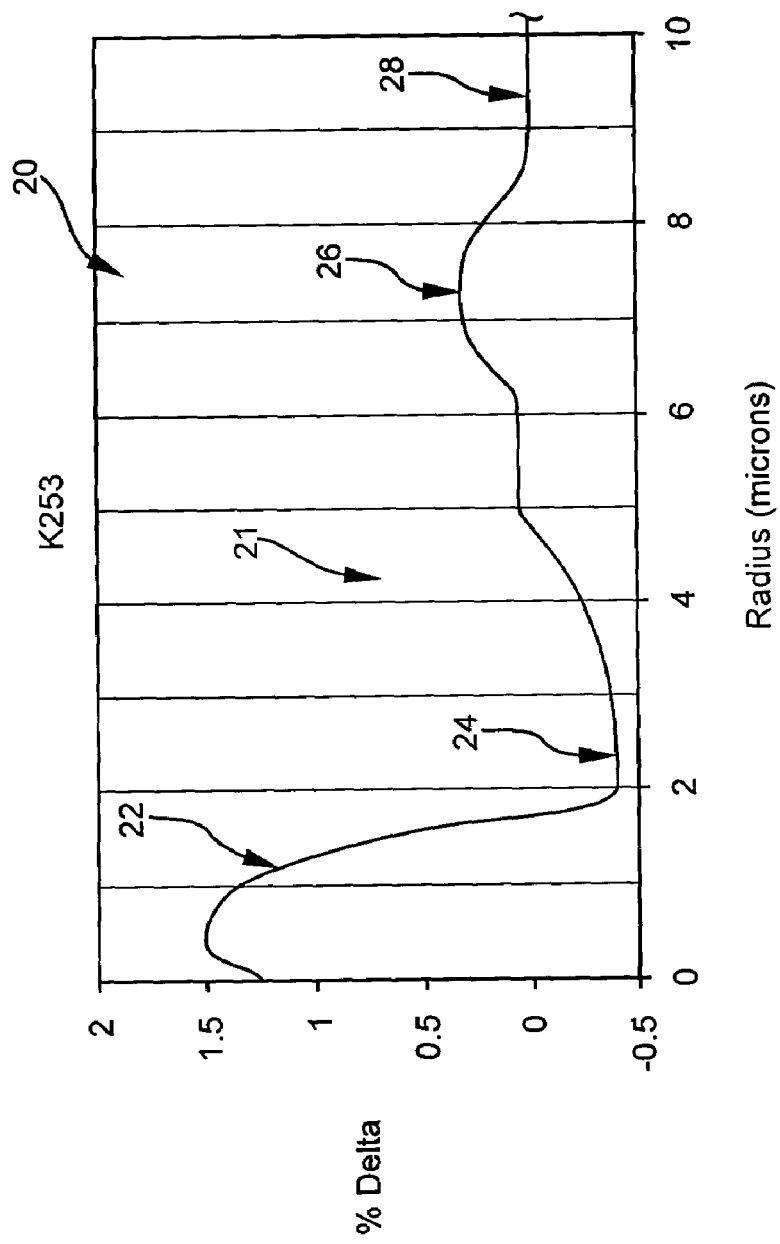
Figure 15:
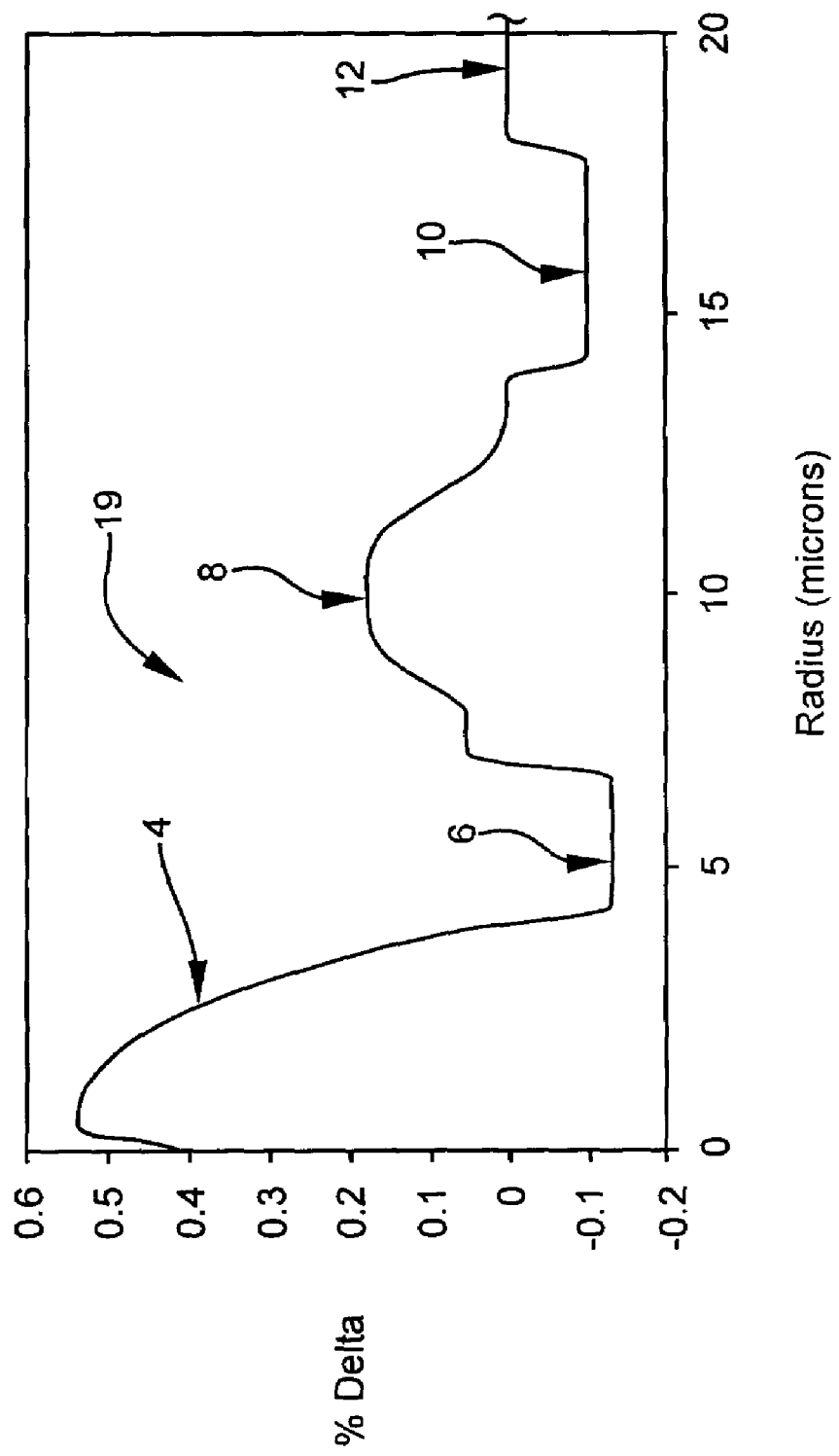
FIG. 15 is a graphic plot of the refractive index of a low slope transmission fiber with which the DC fiber in accordance with the present invention is designed to be utilized.
Figure 16:
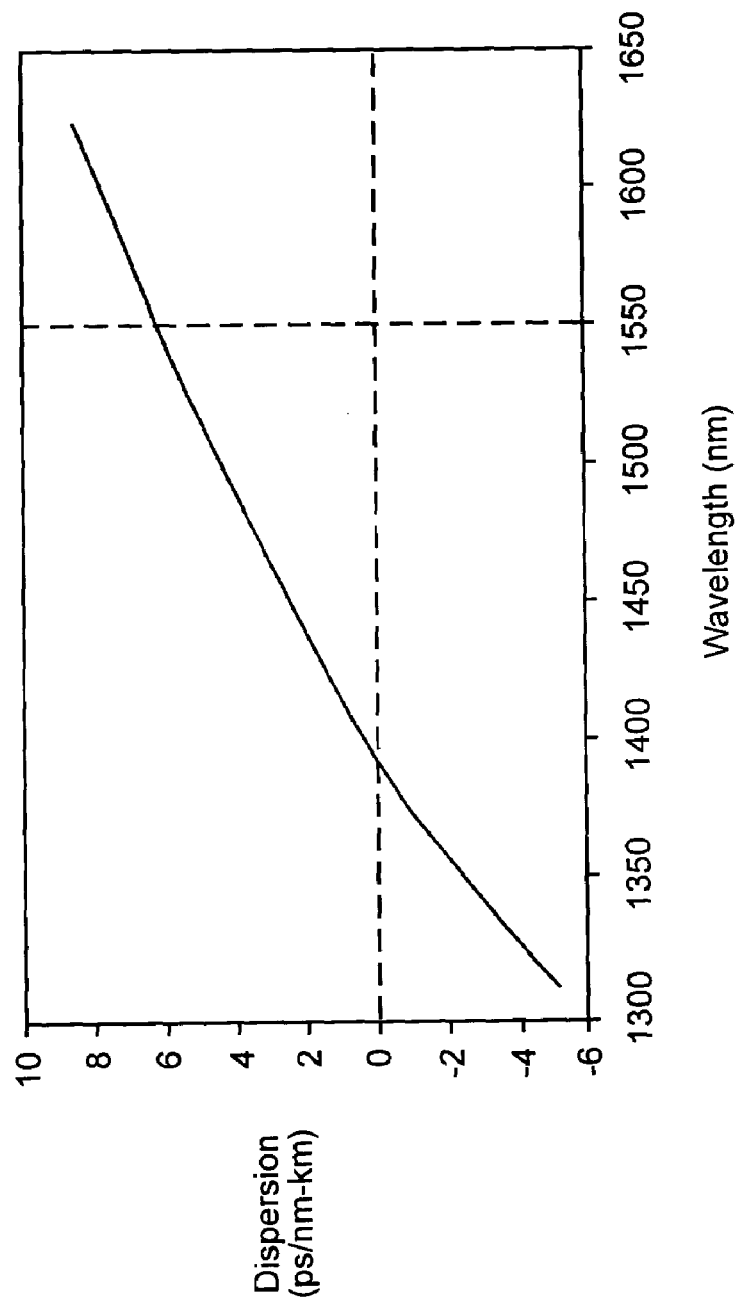
FIG. 16 is a graphic plot of dispersion as a function of wavelength for a transmission fiber of FIG. 15.

FIG. 14 illustrates a plot 64 of modeled average residual dispersion over the C and L bands (1525 to 1625 nm) for a transmission line 18 including 10 km of the DCF 20 designated K194 in Table 1 above and FIG. 6 herein, and 100 km of the NZDSF 19 of Table 2. The profile plot for a preferred transmission fiber 19 is shown in FIG. 15 whereas the dispersion plot for that transmission fiber is illustrated in FIG. 16. As shown in FIG. 15, the preferred transmission drawn may be manufactured in accordance with any known method, such as any known chemical vapor deposition method. Chemical vapor deposition methods include OVD, MCVD, PCVD or the like. Most preferably, the DC fiber preform may be manufactured by an OVD method wherein the preform portion corresponding to the central core 22 is first manufactured by depositing silicon oxide soot doped with germania oxide onto a rotating tapered alumina mandrel to a desired diameter. The soot is doped with the appropriate level of germania dopant to achieve the desired refractive index profile for the central core segment including the appropriate Δ$_1$%. The mandrel is then removed and the soot preform constituting the central core 22 is thoroughly dried in a preferably helium and chlorine containing environment and then consolidated in a consolidating furnace including a helium atmosphere. The consolidated central core blank is then redrawn into a single-segment core cane of about 9 to 11 mm in diameter. During the redraw process, the centerline aperture resulting from removal of the mandrel is closed through the application of a vacuum or by other known methods.

Redrawn single-segment core cane then becomes the target deposition surface for the application of further soot to form the preform portion corresponding to the moat 24. Silica soot is deposited onto the cane to an appropriate diameter for the moat and is then preferably dried within a consolidation furnace within a helium- and chlorine-containing atmosphere in a consolidation furnace. The soot preform is then doped with a suitable fluorine-containing gas, such as $C_2F_6$, $C_2F_2Cl_2$, $CF_4$, $SF_6$, or $SiF_4$, or the like, and subsequently consolidated and again redrawn into a two-segment core cane. U.S. Pat. No. 4,629,485 to Berkey describes one such method for fluorine doping an optical fiber preform.

This two-segment core cane material now becomes the deposition surface for the preform portion corresponding to the ring 26. Germania-doped silica soot is next deposited on the two-segment cane and is subsequently dried and consolidated as herein before described. Again, the consolidated blank is redrawn and this time becomes the final core cane including three segments corresponding to the central core 22, moat 24, and ring 26 of the segmented physical core 21. Additional silica soot that comprises the cladding 28 is then deposited on the final core cane to form the overclad soot blank. The overclad soot blank is dried and consolidated and subsequently transferred to a draw furnace where the present invention DC fiber 20 is drawn therefrom in accordance with conventional draw methods.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A dispersion compensation fiber, comprising:
    a refractive index profile including
        a central core having a positive core delta ($\Delta 1$) less than 1.8%,
        a moat surrounding the central core having a negative moat delta ($\Delta 2$) greater than −0.9%, and
        a ring surrounding the moat having a positive ring delta ($\Delta 3$), the refractive index profile selected to provide
        a total dispersion less than −40 and greater than −87 ps/nm/km at 1550 nm; and
        a kappa value defined as the total dispersion at 1550 nm divided by the dispersion slope at 1550 nm of greater than 165 and less than 270 nm.
        effective area of greater than 18 square microns at 1550 nm; and
        pin array bend loss of less than 8 dB at 1550 nm.

2. The dispersion compensation fiber of claim 1 further comprising total dispersion less than −40 and greater than −70 ps/nm/km at 1550 nm.

3. The dispersion compensation fiber of claim 1 further comprising dispersion slope of between −0.2 and −0.45 ps/nm$^2$/km at 1550 nm.

4. The dispersion compensation fiber of claim 1 further comprising dispersion slope of less than −0.3 and greater than −0.45 ps/nm$^2$/km at 1550 nm.

5. The dispersion compensation fiber of claim 1 further comprising kappa greater than 175 and less than 230 nm at 1550 nm.

6. The dispersion compensation fiber of claim 1 wherein the core-moat ratio, defined as an outer radius of the central core divided by an outer radius of the moat, is greater than 0.3 and less than 0.45.

7. The dispersion compensation fiber of claim 1 wherein the core delta ($\Delta 1$) is less than 1.5%.

8. The dispersion compensation fiber of claim 7 wherein an outer core radius (R1) of the central core is between about 1.7 and 2.2 microns.

9. The dispersion compensation fiber of claim 1 wherein the moat delta ($\Delta 2$) is greater than −0.6%.

10. The dispersion compensation fiber of claim 9 wherein the moat delta ($\Delta 2$) is between −0.35% and −0.5%.

11. The dispersion compensation fiber of claim 9 wherein the outer moat radius (R2) is between about 4.4 and 5.5 microns.

12. The dispersion compensation fiber of claim 1 wherein the ring delta ($\Delta 3$) is between about 0.25% and 0.5%.

13. The dispersion compensation fiber of claim 12 wherein the ring radius (R3) to an approximate center of the ring is between about 6.5 and 8.5 microns.

14. The dispersion compensation fiber of claim 1 wherein a ring offset Ro defined as $$Ro=[R3-R2]-Wh/2$$

is greater than 0.5 microns, where R3 is the ring radius, R2 is the radius to an outer edge of the moat, and Wh is the width of the ring as measured at a ring half delta value.

15. The dispersion compensation fiber of claim 14 wherein the ring offset Ro is greater than 1.0 micron.

16. The dispersion compensation fiber of claim 14 wherein the ring offset Ro is between 0.75 and 2.5 microns.

17. An optical transmission line, wherein the dispersion compensation fiber as set forth in claim 1 is optically connected to a transmission fiber having:
    a total dispersion between 4 and 10 ps/nm/km at 1550 nm, and
    a positive dispersion slope of less than 0.045 ps/nm$^2$/km at 1550 nm.

18. The optical transmission line of claim 17 wherein the dispersion is between 4 and 8 ps/nm/km at 1550 nm.

19. The optical transmission line of claim 17 wherein the transmission fiber comprises a kappa value defined as total dispersion at 1550 nm divided by dispersion slope at 1550 nm of between 147 and 240 nm.

20. The optical transmission line of claim 17 wherein a High-to-Low average residual dispersion for the transmission line over an entire C+L band having a wavelength range from 1525 nm to 1625 nm is less than 0.12 ps/nm/km.

21. The optical transmission line of claim 17 wherein a High-to-Low average residual dispersion for the transmission line over an entire C-band having a wavelength range from 1525 nm to 1565 nm is less than 0.10 ps/nm/km.

22. The optical transmission line of claim 17 wherein a High-to-Low average residual dispersion for the transmission line over an entire L-band having a wavelength range from 1565 nm to 1625 nm is less than 0.10 ps/nm/km.

23. A dispersion compensation fiber, comprising:
    a refractive index profile including
        a central core having a positive core delta ($\Delta 1$) less than 1.5%,
        a moat surrounding the central core having a negative moat delta ($\Delta 2$) between −0.35% and −0.5%, and a ring surrounding the moat having a positive ring delta (Δ3), the refractive index profile selected to provide a total dispersion less than −40 and greater than −87 ps/nm/km at 1550 nm;

a dispersion slope of between −0.2 and −0.45 ps/nm$^2$/km at 1550 nm; and a kappa value defined as the total dispersion at 1550 nm divided by the dispersion slope at 1550 nm of greater than 165 and less than 270 nm.

effective area of greater than 18 square microns at 1550 nm; and pin array bend loss of less than 8 dB at 1550 nm.

24. A dispersion compensation fiber, comprising:

a refractive index profile including a central core having a positive core delta (Δ1) less than 1.5%, a moat surrounding the central core having a negative moat delta (Δ2) greater than −0.6%, and a ring surrounding the moat having a positive ring delta (Δ3), a core-moat ratio, defined as an outer radius of the central core divided by an outer radius of the moat, is greater than 0.3 and less than 0.45, and the refractive index profile is selected to provide a total dispersion less than −40 and greater than −87 ps/nm/km at 1550 nm;

a dispersion slope of between −0.2 and −0.45 ps/nm$^2$/km at 1550 nm; and a kappa value defined as the total dispersion at 1550 nm divided by the dispersion slope at 1550 nm of greater than 175 and less than 230 nm;

effective area of greater than 18 square microns at 1550 nm; and pin array bend loss of less than 8 dB at 1550 nm.

25. A dispersion compensation fiber, comprising:

a refractive index profile including a central core having a positive core delta (Δ1) less than 1.8%, a moat surrounding the central core having a negative moat delta (Δ2) greater than −0.9%, and a ring surrounding the moat having a positive ring delta (Δ3), the refractive index profile selected to provide a total dispersion less than −40 and greater than −87 ps/nm/km at 1550 nm;

a kappa value defined as the total dispersion at 1550 nm divided by the dispersion slope at 1550 nm of greater than 165 and less than 270 nm;

effective area of greater than 18 square microns at 1550 nm;

pin array bend loss of less than 8 dB at 1550 nm; and cutoff of less than 1732 nm.

* * * * *